United States Patent [19]
Giersch

[11] Patent Number: 6,022,531
[45] Date of Patent: Feb. 8, 2000

[54] USE OF 2,5,6-TRIMETHYL-2-HEPTANOL IN PERFUMERY AND AS FLAVORING INGREDIENT

[75] Inventor: Wolfgang Giersch, Bernex, Switzerland

[73] Assignee: Firmenich SA, Geneva, Switzerland

[21] Appl. No.: 09/231,110

[22] Filed: Jan. 14, 1999

[30] Foreign Application Priority Data

Feb. 3, 1998 [CH] Switzerland ................ 1998 0248/98

[51] Int. Cl.⁷ .............................. A61K 7/00; A61K 9/68; A61K 7/32; A61K 7/06; A61L 9/04
[52] U.S. Cl. ................................ 424/65; 424/48; 424/65; 424/70.1; 424/76.4; 424/439; 510/101; 512/1; 512/25; 514/724; 514/844
[58] Field of Search ..................... 512/1, 25; 424/439, 424/401, 65, 70.1, 76.4, 48; 514/724, 844; 510/101

[56] References Cited

U.S. PATENT DOCUMENTS 4,420,423  12/1983  Boden et al. ................. 252/522 R

*Primary Examiner*—Shelley A. Dodson
*Assistant Examiner*—Marina Lamm
*Attorney, Agent, or Firm*—Pennie & Edmonds LLP

[57] ABSTRACT

The 2,5,6-trimethyl-2-heptanol described is a compound having an odor of the floral-freesia type, with a slightly fruity character. It is adapted to be used in practically all fields of modem perfumery. Thanks to its typical floral and woody taste, it is also a prized flavoring ingredient.

11 Claims, No Drawings

USE OF 2,5,6-TRIMETHYL-2-HEPTANOL IN PERFUMERY AND AS FLAVORING INGREDIENT

BRIEF SUMMARY OF THE INVENTION

The present invention relates to the field of flavors and fragrances. It concerns, more particularly, the use of a compound of formula

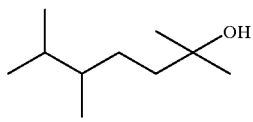

or 2,5,6-trimethyl-2-heptanol, as perfuming and flavoring ingredient.

BACKGROUND OF THE INVENTION

The compound which is the object of the present application has been known for a long time and is mentioned in the Beilstein reference book. However, there is nowhere found any description of its odor or taste or even a proposal for its use in perfumery, or in flavors.

DETAILED DESCRIPTION OF THE INVENTION

The object of the present invention is therefore the use of 2,5,6-trimethyl-2-heptanol in perfumery, as well as perfuming compositions or perfumed articles containing the said compound. Another object of the invention is the use of 2,5,6-trimethyl-2-heptanol as flavoring ingredient, and the foodstuffs containing the said compound.

Having synthesized the compound, we surprisingly found that it presented excellent olfactive and gustative qualities, rendering it quite useful as perfuming and flavoring ingredient.

The odor of 2,5,6-trimethyl-2-heptanol is of the floral type. More precisely, it is a note of the white flower type, with a linalol-freesia connotation. The professional perfumers by whom the compound was evaluated have likewise found that it possesses a fruity undernote, accompanied by a much appreciated velvety tone.

These olfactive properties are even more surprising when considering that a good number of tertiary terpene alcohols, saturated or unsaturated, are known in the field of perfumery, some of them being of widespread use, but which, however, do not show the advantages of the compounds of the invention. As non-exhaustive examples, one can cite here ethyllinalol, tetrahydrolinalol, and, of course, linalol itself. With respect to the known compounds having all a structure very close to that of 2,5,6-trimethyl-2-heptanol, this latter carries a methyl substituent in δ-position with respect to the alcohol group. The structural variation gives rise to a significant and surprising modification of the olfactive properties and also of other parameters important in perfumery.

Further to its characteristic above-described olfactive note, the odor of 2,5,6-trimethyl-2-heptanol also turned out to be very tenacious and elegant and, moreover, very powerful. With respect to linalol, the note of this latter is less powerful and less elegant, but, above all, less tenacious. The odors of ethyllinalol and tetrahydrolinalol turned out to be less powerful and also less elegant. Furthermore, with regard to 2,6-dimethyl-2-heptanol (origin: Givaudan-Roure, Vernier, Switzerland), the compound of the invention shows a far sweeter, bergamot-like and almost powdery-vanilla odor than its known analogue, which develops a more aggressive, pungent and herbaceous fragrance.

The present invention also concerns the two enantiomers of the 2,5,6-trimethyl-2-heptanol of the invention. It was found that the two enantiomers possessed similar odor characteristics to those of the racemic mixture.

The (+)-(R)-2,5,6-trimethyl-2-heptanol has an odor typical of white flowers, reminiscent of linalol, with a slight connotation of terpineol, and a lilac and fruity note.

The odor of its enantiomer of the (−)-(S) configuration is more floral and citrus-like, showing a note reminiscent of dimethyloctanol. The perfumers also found a soapy and a slight aldehyde connotation. The overall impression of the compound was less of the lilac type and closer to a rosy-lily of the valley odor than its enantiomer.

The 2,5,6-trimethyl-2-heptanol of the invention, in the form of a racemic mixture or of a pure enantiomer, thus brings a new note of the floral type to the perfumer's palette. Thanks to the advantages laid out above, this compound is appropriate for the use in a large number of potential applications in perfumery.

The 2,5,6-trimethyl-2-heptanol is suited for the use in practically every field of modern perfumery. In this respect, there should be cited the application in functional perfumery, more particularly in soaps, bath and shower gels, shampoos, body deodorants and antiperspirants, air fresheners, liquid or solid detergents for the treatment of textiles, or yet detergent compositions or all-purpose cleaners for the cleaning of dishes or various surfaces, or in cosmetic preparations.

The compound of the invention also proved themselve to be stable in difficult and aggressive media like, for example, textile detergents containing bleaching agents and activators like tetraacetylethylenediamine (TAED), hypohalites, in particular hypochlorite, the latter being present in chlorine bleach, peroxygenated bleaching agents like perborates, body deodorants containing aluminum salts, or fabric softeners.

Of course, its use is not restricted to the above-mentioned products, and the compound also lends itself for the use in fine perfumery, namely perfumes and colognes.

In all cited applications, the compound of the invention can be used alone or in admixture with other perfuming ingredients, solvents or adjuvants of current use in the art. The nature and the variety of these coingredients do not require a more detailed description here, which, moreover, would not be exhaustive, and the person skilled in the art will be able to choose the latter through its general knowledge and as a function of the nature of the product to be perfumed and of the desired olfactive effect.

These perfuming ingredients belong to chemical classes as varied as alcohols, aldehydes, ketones, esters, ethers, acetates, nitrites, terpene hydrocarbons, sulfur- and nitrogen-containing heterocyclic compounds, as well as essential oils of natural or synthetic origin. A large number of these ingredients is moreover listed in reference textbooks such as the book of S. Arctander, Perfume and Flavor Chemicals, 1969, Montclair, N.J., USA, or its more recent versions, or in other works of similar nature.

The proportions in which the compound according to the invention can be incorporated in the various products mentioned beforehand vary within a large range of values. These values depend on the nature of the article or product that one desires to perfume and the odor effect searched for, as well as on the nature of the coingredients in a given composition when the compound of the invention is used in admixture with perfuming coingredients, solvents or adjuvants of current use in the art.

As an example, there can be cited typical concentrations of the order of 1 to 10%, or even 20%, by weight of this compound relative to the weight of the perfuming composition in which it is incorporated. Far lower concentrations than those mentioned above can be used when the compound is directly applied for perfuming the various consumer products cited beforehand.

Moreover, as will be apparent from the examples below, it was found that 2,5,6-trimethyl-2-heptanol is particularly useful for the preparation of freesia type reconstitutions in which it advantageously replaces linalol.

The compound of the invention also turned out to be a useful flavoring ingredient. Its taste is described as being floral and woody, with a certain reminiscence of linalol and an undernote of a-terpineol. It can be used in foods, beverages, chewing gums or pharmaceutical preparations. It was found to be particularly appropriate in flavors of the fruity-sweet type. It performed best in tea-, peach- or honey applications, where its typical taste profile is very much appreciated and can be advantageously used to underline the fruity, sweet and creamy character of the foodstuffs into which it is incorporated.

When the compound of the invention is incorporated in flavoring compositions used for the flavoring of the products mentioned, it will generally be used in concentrations ranging from about 1 to 20% by weight of the flavoring composition, based on the total weight of the latter.

EMBODIMENTS OF THE INVENTION

The compound of the invention, in form of its racemate, is synthesized from 2-isopropyl-2-propenal [see Schulte-Elte et al., Helvetica Chimica Acta 75, 759 (1992)] in a three-step synthesis which is illustrated in the following scheme I.

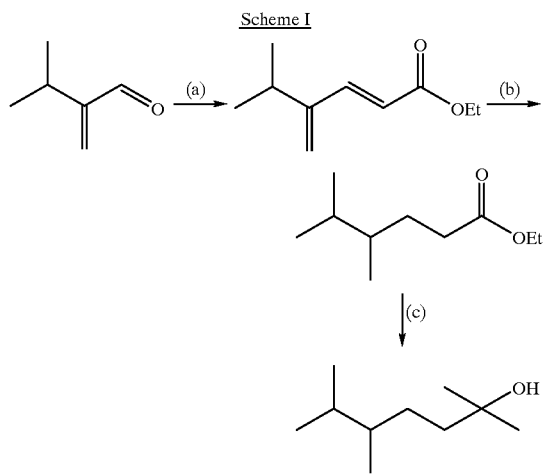

(a) (EtO)₂P(O)CH₂CO₂Et/NaOEt
(b) Pd/C
(c) MeMgI
Et = ehtyl
Me = methyl

The starting 2-isopropyl-2-propenal is transformed to ethyl 4-isopropyl-2,4-pentadienoate in a Wittig-Horner-type reaction. The thus-obtained compound is then hydrogenated using a palladium/activated charcoal catalyst, and the thus-obtained ethyl 4,5-dimethylhexanoate is transformed into the desired compound of the invention by making it react with 2 equivalents of CH₃MgI.

The synthesis of the (R) and (S) enantiomer of the 2,5,6-trimethyl-2-heptanol of the invention is carried out starting from (+)-(R) and (−)-(S)-citronellal, respectively, in a 7-step synthesis, outlined in the following scheme II. The absolute configurations of the enantiomeric 2,5,6-trimethyl-2-heptanols obtained were attributed in analogy with the starting products, as all reactions proceed with retention of the configuration.

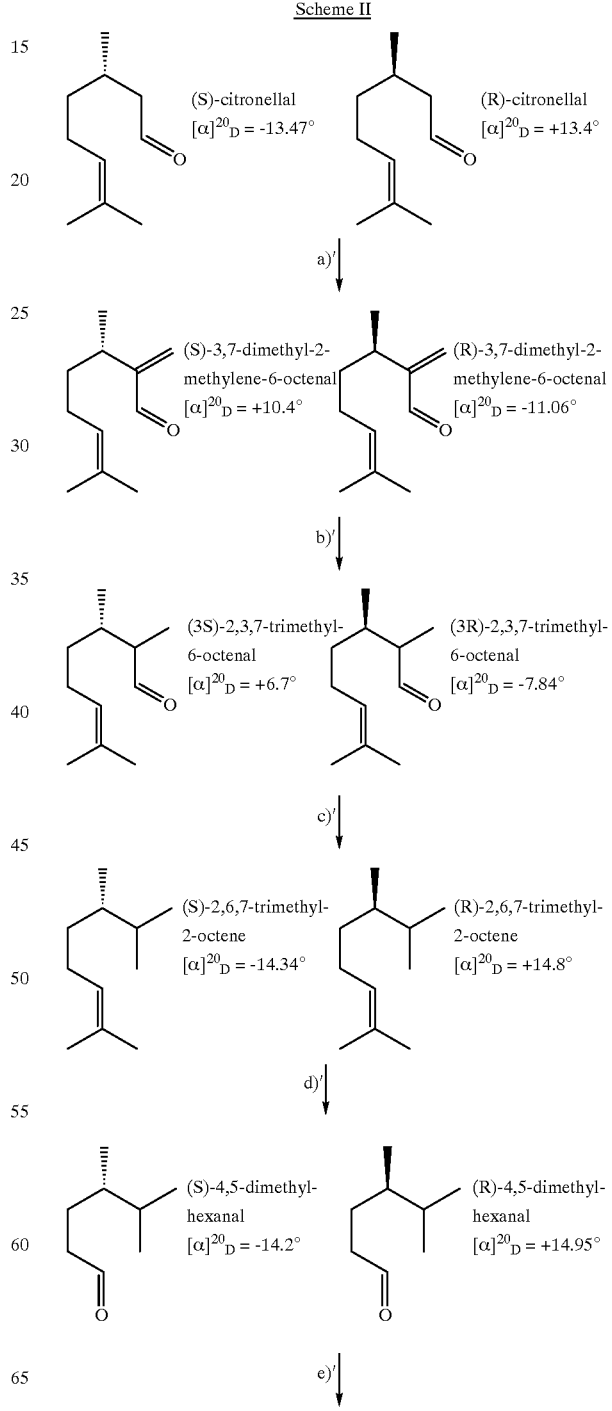

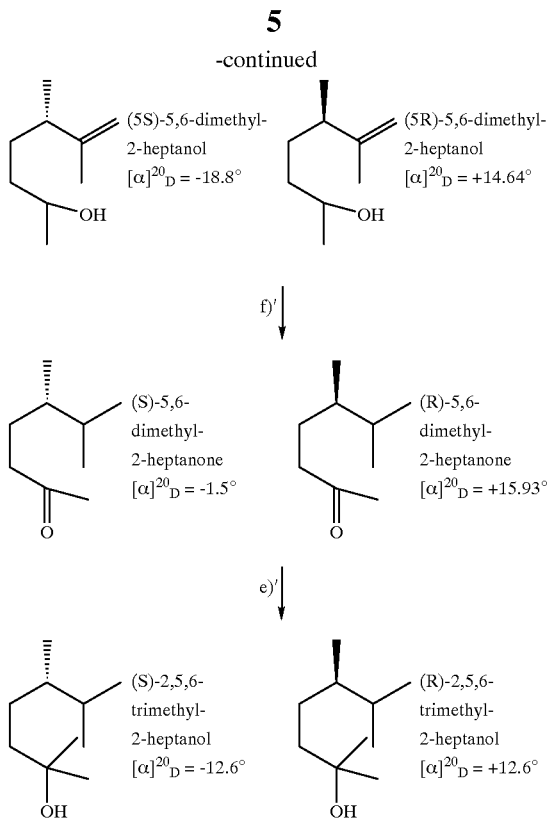

(a)' diethylaminehydrochloride, formaldehyde, reflux at pH 7–8 for 6h
(b)' Pd/CaCO₃ 5% (pentane), trace of chinolin
(c)' hydrazine, NaOH (diethyleneglycol), reflux 1 h
(d)' ozone (ethylacetate), triphenylphosphine
(e)' MeMgI
(f)' pyridinium chlorochromate (CH₂Cl₂)

In step (a)', the citronellal is subjected to a Mannich type reaction, followed by hydrogenation of the methylene group (b)', a Huang-Minlon type reduction of the carbonyl group (c)', the ozonolysis of the remaining double bond (d)', a first Grignard reaction (e)', oxidation of the hydroxy group by pyridinium chlorochromate (f)' and a further Grignard reaction (e)'. The desired compound of configuration (R) or (S) is obtained in a pure state.

The invention will now be illustrated in greater detail in the following examples in which the abbreviations have the usual meaning in the art. The temperatures are indicated in degrees Celsius, and the NMR values (chemical shift δ) are given in ppm relative to TMS as internal standard.

EXAMPLES

Example 1

Preparation of 2,5,6-Trimethyl-2-Heptanol as a Racemate a) Preparation of ethyl 4-isopropyl-2,4-pentadienoate 10 g (102 mmol) and 22.9 g of ethyl diethylphosphonylacetate were dissolved in 50 ml of pentane. Sodium ethanolate prepared from 3 g of sodium (130 mmol) and 60 ml of ethanol were added with stirring. The reaction was continued for 15 h at room temperature, and the reaction mixture was then poured on ice, washed with brine and the solvent removed. The residue was then distilled at 100° C./15 hPa to give 10.1 g (59%) of pure product.

NMR($^1$H): 1.11(d, J=6.8, 6H); 1.31(t, J=7.2, 3H); 2.6(h, J=6.8, 1H); 4.22(q, J=7.2, 2H); 5.32 and 5.36(2s, 2H); 5.97(d, J=16, 1H); 7.31(d, J=16, 1H) δppm MS: 168(M⁺, 40), 153(23), 139(10), 125(58), 95(100), 79(69), 67(54), 55(41), 41(67), 27(85).

b) Preparation of ethyl 4,5-dimethylhexanoate 5 g (30 mmol) of the product obtained in step a) were dissolved in 50 ml of ethyl acetate, and 50 mg of palladium on activated charcoal were added. The hydrogenation reaction was carried out over 24 h at room temperature. The solution was filtered and the filtrate distilled to obtain the desired product at 110° C./15 hPa and in a yield of 3.6 g (70%).

NMR($^1$H): 1.32(d, J=6.8, 3H); 1.33(d, J=6.8, 3H); 1.37(d, J=7.2, 3H); 1.27(t, J=7.2, 3H); 4.12(q, J=7.2, 2H) δppm MS: 172(M⁺, 0), 157(1), 129(33), 101(100), 88(75), 55(69), 43(70), 29(57).

c) Preparation of 2,5,6-trimethyl-2-heptanol 20 g (116 mmol) of the product obtained in step b) were dissolved in 100 ml of diethyl ether and then added, at room temperature, to a solution of CH₃MgI which had been prepared beforehand from magnesium and CH₃I. The reaction mixture was brought to reflux after the end of the exothermic reaction. After 4 h, the mixture which was cooled to room temperature was poured on a NaOH/ice mixture and extracted twice with ether. The organic phase was washed with brine and water and then dried. After evaporation of the solvent, the crude product was distilled to obtain the desired alcohol at 32° C./0.2 hPa, to obtain 16.3 g (88.7%) of the desired product.

NMR($^1$H): 0.82(d, J=6.8, 6H); 0.88(d, J=6.8, 3H); 1.22(s, 6H) δppm MS: 158(M⁺, 0), 143(2), 125(1), 97(3), 83(6), 69(16), 59(100), 43(20).

Example 2

Preparation of a Perfuming Composition for a Detergent

A composition for the perfuming of a detergent was prepared from the following ingredients:

| Ingredients | Parts by weight |
|---|---|
| Linalyl acetate | 400 |
| Tricyclo[5.2.1.0.(2,6)]dec-3-en-8-yl acetate | 50 |
| Hexylcinnamic aldehyde | 400 |
| Allyl amyl glycolate | 10 |
| Cetalox ®[1] | 20 |
| Citronellol | 50 |
| Coumarin | 40 |
| Dihydromyrcenol[2] | 300 |
| Galaxolide ®[3] | 40 |
| Geraniol | 70 |
| Habanolide ®[4]' | 520 |
| Hedione ®[5] | 500 |
| Iso E Super[6] | 300 |
| Jasmal[7] | 60 |
| Lilial ®[8] | 100 |
| 10%* Dynascone ®[9] | 50 |
| 10%* (Z)-Jasmone | 40 |
| Phenylhexanol | 100 |
| Hexyl salicylate | 230 |
| (Z)-3-Hexenol salicylate | 30 |
| β-Ionone | 150 |
| 50% (+)-(1S,2S,3S)-2,6,6-Trimethyl-bicyclo[3.1.1]-heptane-3-spiro-2'-cyclohexen-4'-one[10]' | 100 |
| Wardia ®[11] | 40 |
| Total | 3600 |

*in dipropylene glycol
[1] 8,12-epoxy-13,14,15,16-tetranorlabdane; origin: Firmenich SA, Geneva, Switzerland
[2] 2,6-dimethyl-7-octane-2-ol; origin: International Flavors & Fragrances, USA
[3] origin: International Flavors & Fragrances, USA
[4] mixture of 1-oxa-12-cyclohexadecen-2-one and 1-oxa-13-cyclohexadecen-2-one; origin: Firmenich SA, Geneva, Switzerland
[5] methyl dihydrojasmonate; origin: Firmenich SA, Geneva, Switzerland -continued

| Ingredients | Parts by weight |
|---|---|
| 6)origin: International Flavors & Fragrances, USA | |
| 7)mixture of 1,3-nonanediyle diacetate and tetrahydro-3-pentyl-4-(2H)-pyranyl acetate; origin: International Flavors & Fragrances, USA | |
| 8)origin: Givaudan-Roure SA, Vernier, Switzerland | |
| 9)1-(5,5-dimethyl-1-cyclohexen-1-yl)-4-penten-1-one; origin: Firmenich SA, Geneva, Switzerland | |
| 10)origin: Firmenich SA, Geneva, Switzerland | |
| 11)rose reconstitution composition; origin: Firmenich SA, Geneva, Switzerland | |

When there were added to this base type composition 400 parts by weight of 2,5,6-trimethyl-2-heptanol, the composition acquired a very floral-fruity note typical for freesia, this note furthermore showing a nice fruity-lily of the valley undernote which was very natural.

When the same amounts of dihydrolinalol and of linalol, respectively, were added, the compositions obtained possessed a clearly less elegant and velvety note, with the floral-fruity character being less pronounced. These two last compounds proved themselves to be generally less effective in this type of composition.

Example 3

Preparation of an Accord of the Floral-Freesia Type

A base type accord was prepared from the following ingredients:

| Ingredients | Parts by weight |
|---|---|
| Methyl anthranilate | 15 |
| Farnesene | 10 |
| 10% Orange flower absolute* | 10 |
| Geraniol | 5 |
| Hedione ®1) | 10 |
| 10% Ocimene* | 10 |
| 10% (Z)-3-Hexenol isobutyrate* | 30 |
| Limonene | 10 |
| Linalyl oxyde | 10 |
| α-Terpineol | 55 |
| α-Ionone | 5 |
| β-Ionone | 30 |
| Total | 200 |

*in dipropylene glycol
1)see example 2

To this base type composition, there were added 2,5,6-trimethyl-2-heptanol and linalol, respectively, until the composition contained 80% by weight of the one or the other of these compounds, in order to obtain a freesia type reconstituion. It was found that in this type of reconstitution, it was not only possible to replace linalol by 2,5,6-trimethyl-2-heptanol, but that the latter also imparted a clearly more natural, elegant and freesia type character to the composition.

When the same amount of 2,6-dimethyl-2-heptanol was added to this base composition, the latter acquired a distinctly more aldehydic-floral and herbaceous-pungent character, also less natural and sweet, than with the compound of the invention. The freesia, white flower, magnolia type odor typically imparted by the latter was totally absent upon replacing the compound of the invention by 2,6-dimethyl-2-heptanol.

Example 4

| Ingredients | Parts by weight |
|---|---|
| Benzyl acetate | 70 |
| Phenylethyl acetate | 10 |
| Methyl anisate | 7 |
| Methyl anthranilate | 5 |
| Benzyl benzoate | 123 |
| Isobutyl benzoate | 7 |
| Methyl benzoate | 5 |
| Benzyl butyrate | 10 |
| Caryophyllene | 7 |
| Citral | 1 |
| Estragol | 5 |
| Eugenol | 1 |
| Geraniol | 7 |
| Hedione ®1) | 55 |
| Indol | 5 |
| Benzyl isobutyrate | 10 |
| 10% (Z)-3-Hexenyl isobutyrate* | 5 |
| Limonene | 5 |
| Methylnaphthylketone | 7 |
| Methyleugenol | 3 |
| (Z)-3-Hexenyl benzoate | 15 |
| (Z)-Jasmone | 70 |
| (E)-8-Decen-5-olide2) | 20 |
| (Z)-3-Hexenol | 7 |
| Benzyl propionate | 15 |
| α-Terpineol | 35 |
| Vanillin | 10 |
| Total | 520 |

*in dipropylene glycol
1)see example 2
2)origin: Firmenich SA, Geneva, Switzerland To this composition, which is a reconstitution of natural "ginger-lily", there were added 80 parts by weight of 2,5,6-trimethyl-2-heptanol and the result obtained compared to those of similar compositions containing the same amount of tetrahydrolinalol, ethyllinalol or linalol, respectively. With respect to the addition of tetrahydrolinalol or ethyllinalol, the new composition of the invention had acquired a clearly more elegant character of the white flower type than the other compositions containing the above-mentioned known ingredients. With respect to linalol, there was obtained, with the compound of the invention, a composition the odor of which resembled less the natural product, but which was richer and velvetier and gave a clearly more elegant impression.

Example 5

Preparation of a Honey Flavor

The following ingredients were mixed to obtain a honey flavor:

| Ingredients | Parts by weight |
|---|---|
| Phenylacetic acid | 100 |
| Benzaldehyde | 25 |
| β-Damascone (1% in propylene glycol) | 10 |
| Furaneol ®1) | 10 |
| Ethyl phenyl acetate | 25 |
| Vanillin | 20 |
| Propylene glycol | 760 |
| 2,5,6-Trimethyl-2-heptanol | 50 |
| Total | 1000 |

| Ingredients | Parts by weight |
| --- | --- |
| [1]4-hydroxy-2,5-dimethyl-3(2H)-furanone; origin: Firmenich SA, Geneva, Switzerland | |

Example 6
Preparation of a Peach Flavor

The following ingredients were mixed to obtain a peach flavor:

| Ingredients | Parts by weight |
| --- | --- |
| Acetaldehyde | 25 |
| γ-Dodecalactone | 40 |
| γ-Undecalactone | 20 |
| γ-Decalactone | 20 |
| Sulfox ®[1](1% in propylene glycol) | 25 |
| Ethyl acetate | 100 |
| Hexanal | 15 |
| Benzyl acetate | 25 |
| Propylene glycol | 700 |
| 2,5,6-Trimethyl-2-heptanol | 30 |
| Total | 1000 |

[1]8-mercapto-3-p-menthanone; origin: Firmenich SA, Geneva, Switzerland

Example 7
Preparation of a Tea Flavor

The following ingredients were mixed, to obtain a flavor to be used for tea:

| Ingredients | Parts by weight |
| --- | --- |
| Benzaldehyde | 5 |
| β-Damascone (1% in propylene glycol) | 40 |
| γ-Heptalactone | 10 |
| (E)-2-Hexenol | 5 |
| Linalyl oxide | 25 |
| Phenylethyl alcohol | 5 |
| (Z)-3-Hexenol | 10 |
| β-Ionone (10% in propylene glycol) | 10 |
| Terpinen-4-ol | 10 |
| Propylene glycol | 815 |
| 2,5,6-Trimethyl-2-heptanol | 65 |
| Total | 1000 |

We claim:

1. A method to improve, enhance or modify the organoleptic properties of a perfuming or flavoring composition, or of a perfumed or flavored article, which method comprises adding to said composition or article an effective amount of 2,5,6-trimethyl-2-heptanol.

2. The method according to claim 1, wherein the 2,5,6-trimethyl-2-heptanol is used in form of its racemate, in the form of one of its enantiomers of configuration (R) or (S), or in form of a mixture containing a preponderant amount of one of its enantiomers.

3. Perfuming composition or perfumed article, containing 2,5,6-trimethyl-2-heptanol as perfuming ingredient in the form of its racemate, in enantiomerically pure form or in form of a mixture containing a preponderant amount of one of its enantiomers.

4. Perfumed article according to claim 3, in form of a perfume or a cologne, a soap, a bath or shower gel, a shampoo or other hair care product, a body deodorant or antiperspirant, an air freshener, a cosmetic preparation, a fabric detergent or softener, or an all-purpose household cleaner.

5. Perfuming composition according to claim 3, wherein the 2,5,6-trimethyl-2-heptanol is used in a concentration of from 1 to 20% by weight based on the total weight of the composition.

6. A flavoring composition or a flavored product, containing as active ingredient 2,5,6-trimethyl-2-heptanol.

7. A flavoring composition according to claim 6, wherein the 2,5,6-trimethyl-2-heptanol is used in a concentration of from 1 to 20% by weight based on the total weight of the composition.

8. A flavored product according to claim 6, in the form of a food or beverage, a chewing gum or a pharmaceutical preparation.

9. The method of claim 1 wherein the 2,5,6-trimethyl-2-heptanol is added in an amount which provides a floral fragrance in the composition or article.

10. The perfuming composition or perfumed article of claim 3, wherein the 2,5,6-trimethyl-2-heptanol is present in an amount which provides a floral fragrance in the composition or article.

11. The flavoring composition or flavored product of claim 6, wherein the 2,5,6-trimethyl-2-heptanol is present in an amount which provides a floral or woody taste to the flavoring composition or flavored product.

* * * * *

UNITED STATES PATENT AND TRADEMARK OFFICE
CERTIFICATE OF CORRECTION

PATENT NO. : 6,022,531

DATED : February 8, 2000

INVENTOR : Wolfgang GIERSCH

It is certified that error appears in the above-identified patent and that said Letters Patent is hereby corrected as shown below:

On the title page, column 2, under "[57] Abstract", fourth line: change "modem" to --modern--.

Column 2, line 55: change "nitrites" to --nitriles--.

Column 3, line 18: change "a-terpineol" to --α-terpineol--.

Column 5, lines 13-19, correct the optical rotation for the compound shown below:

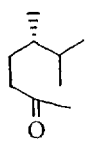

(S)-5,6-dimethyl-
2-heptanone
$[\alpha]^{20}_D = -15°$

Column 6, line 62: change "²⁾2,6-dimethyl-7-octane-2-ol;" to --²⁾2,6-dimethyl-7-octene-2-ol;--.

Column 8, line 2, under "Example 4", insert --<u>Preparation of a perfume having a "ginger-lily" character</u>--.

Signed and Sealed this

Thirteenth Day of March, 2001

*Attest:*

NICHOLAS P. GODICI

*Attesting Officer*   *Acting Director of the United States Patent and Trademark Office*